DRIVER-SENSE CIRCUIT ARRANGEMENT

Filed Dec. 30, 1965

INVENTOR.
JOSEPH R. BURNS
BY John V. Regan
Attorney

United States Patent Office 3,275,996
Patented Sept. 27, 1966

3,275,996

DRIVER-SENSE CIRCUIT ARRANGEMENT

Joseph R. Burns, Trenton, N.J., assignor to Radio Corporation of America, a corporation of Delaware Filed Dec. 30, 1965, Ser. No. 517,554
10 Claims. (Cl. 340—173)

This invention relates to electrical circuits and, in particular, to a circuit arrangement which allows information to be written into, and read out of, a memory element via a common input-output line.

It has been suggested that a high speed memory for a data processing system take the form of a plurality, e.g. an array, of active memory elements. It has been suggested further that the memory elements be flip-flops employing field-effect transistors, and that the entire memory array be fabricated as an integrated structure in order to provide a large quantity of storage in a small area and to reduce delays so as to achieve high speed operation.

In an integrated memory array, it is desirable to minimize the number of row and column conductors so as to reduce the number of crossovers in the integrated array and the number of external connections to the memory. As is known, the capacitance on the output line of an integrated memory may be quite high. It is therefore desirable to employ current sensing rather than voltage sensing. Higher speed operation obtains when current sensing is employed, since it is then unnecessary to charge and discharge line capacitances.

It is an object of this invention to provide an arrangement whereby information may be both written into and read out of a flip-flop via a common input-sense line.

It is another object of this invention to provide a circuit arrangement which reduces the number of row and column conductors required in an integrated memory of active storage elements.

It is still another object of this invention to provide a circuit arrangement for both writing information into a memory cell and reading out that cell via a common input-sense conductor, in which the read-out is nondestructive.

A further object of this invention is to provide an improved sense-drive circuit for an active memory cell, in which circuit current sensing is employed.

In an arrangement embodying the invention, a common input-sense line is connected to the input means of a memory element. This line also is connected to the conduction path of a coincidence gate means, the impedance of which is controlled jointly by the output of the memory element and by applied read command signals. First and second transistors of opposite conductivity type have their control electrodes connected in common and have second, other like electrodes connected to the input-sense line. An impedance element, e.g. a resistor, is connected to the remaining electrode of the first transistor, and an output terminal is provided for sampling the voltage developed across the impedance element. Input signals applied at the control electrodes of the transistors have either a first value which biases the first transistor on and the second transistor off, or a second value which biases the first transistor off and the second transistor off.

Figure 1:
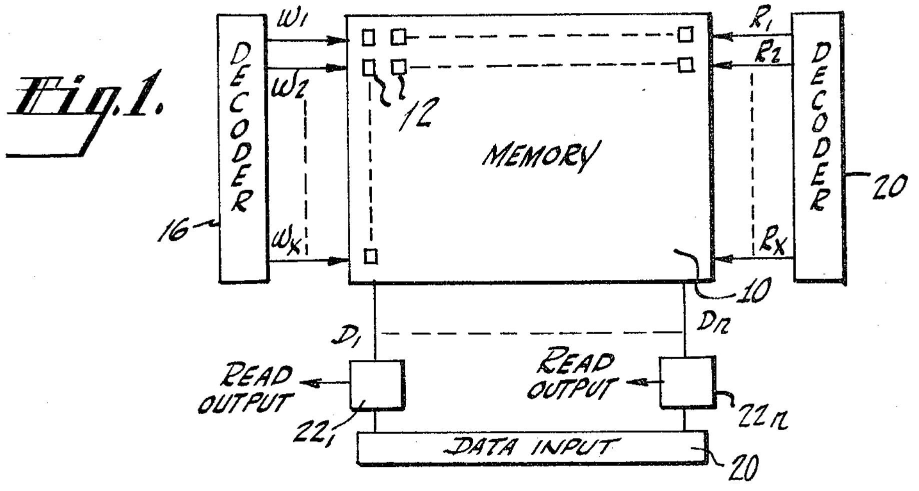
FIGURE 1 is a block diagram of a memory system.

In the system of FIGURE 1, a memory 10 comprises a plurality of memory elements 12, only a few of which are shown. These memory elements may be arranged in a rectangular array of rows and columns. For purposes of example, it is assumed that the memory is word organized, wherein each row of memory elements stores a different word of information, and wherein the memory elements in the same column store the digits of like place or significance in the respective words. Each row of elements has a pair of row conductors, one for receiving WRITE command levels and the other for receiving READ command levels. All of the WRITE lines $W_1$, $W_2$ . . . $W_x$ are connected at their input ends to a decoder 16, which receives input signals from a source (not shown) and energizes one only of the WRITE lines during a WRITE operation. The READ lines $R_1$, $R_2$ . . . $R_x$ are connected to a decoder 18 which, in response to received input signals, energizes one of the READ lines during a READ operation. Although separate decoders 16 and 18 are illustrated, a single decoder could be employed with suitable output logic to drive the WRITE and READ lines of the memory.

Information to be written into a row of the memory is supplied from a data input source 20 by way of digit lines $D_1$ . . . $D_n$, there being a separate digit line for each column of memory elements. The data stored in the input device 20 is written into a given row of memory elements 12 when the WRITE line for that row is energized.

In order to reduce or minimize the number of row and column lines in the memory, it is desirable to use the digit lines $D_1$ . . . $D_n$ for both writing information into the memory and for reading out (sensing) information stored in the memory. As will be described, the information stored in a row of the memory may be read out selectively and nondestructively on the digit lines when the READ control line for that row is energized. The use of the digit lines for both input and sensing is made possible by the circuitry represented by the boxes $22_1$ . . . $22_n$.

Figure 2:
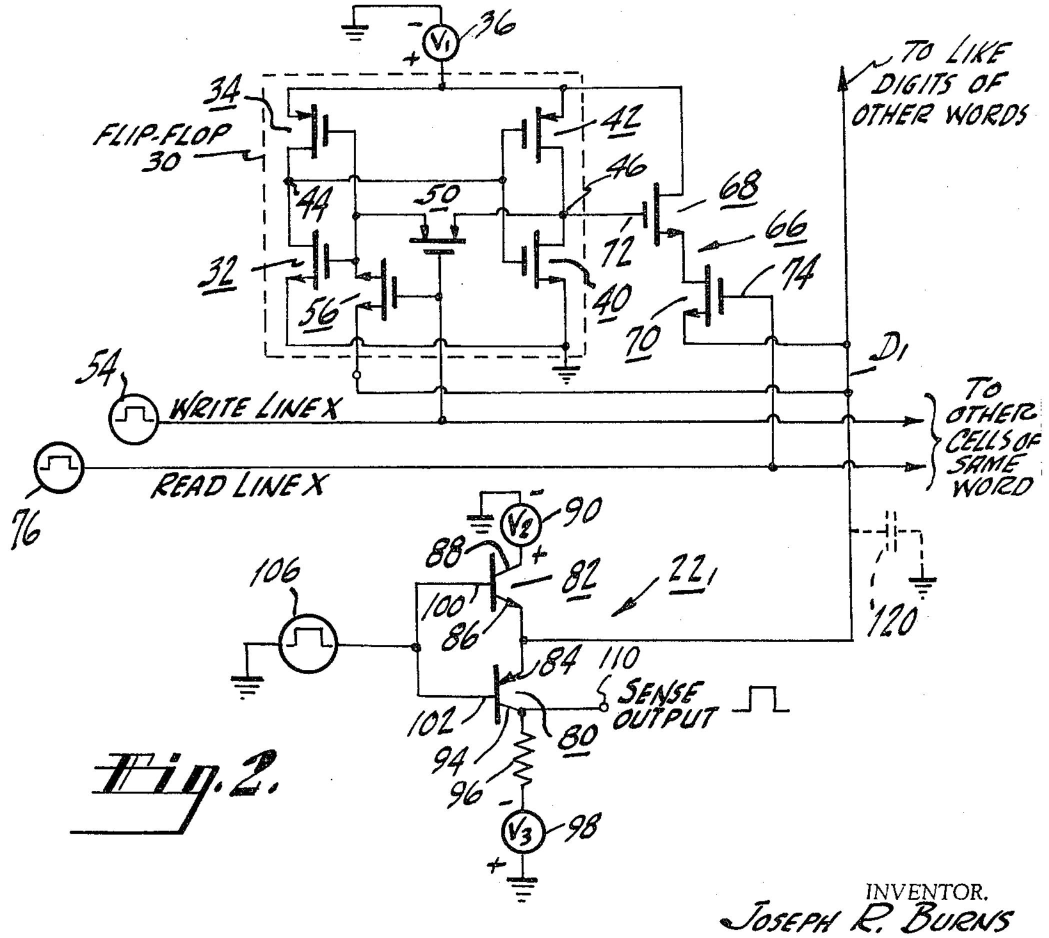
FIGURE 2 is a schematic diagram of one of the memory cells and a sense-drive circuit for the cell.

All of the memory cells in memory 10 are the same and may take the form of an insulated-gate field-effect transistor flip-flop. The flip-flop for the memory cell at the intersection of row X and column 1 is illustrated within the dashed box 30 of FIGURE 2, and the driver-sense circuit $22_1$ for the associated column of flip-flops is shown at the bottom of FIGURE 2.

This flip-flop is known in the art and, consequently, will only be described briefly here. This flip-flop includes a first circuit branch comprising an N-type insulated-gate field-effect transistor 32 and a P-type transistor 34 having their conduction paths, e.g. source-drain paths, connected in series between circuit ground and the positive terminal of a source 36 of $V_1$ volts, the negative terminal of source 36 being grounded. A second circuit branch comprises an N-type transistor 40 and a P-type transistor 42 having their conduction paths connected in series between circuit ground and the voltage source 36.

Feedback from the output of the first circuit branch to the input of the second branch is provided by a direct connection from output junction 44 to the gate electrodes of transistors 40 and 42. Feedback from the output of the second branch to the input of the first branch is by way of the conduction path of a normally "on" P-type transistor 50, which is connected between output junction 46 and the gate electrodes of transistors 32 and 34. Information is written into the flip-flop from digit line $D_1$ via the source-drain conduction path of an N-type transistor 56. The gate electrodes of transistors 50 and 56 are connected to WRITE line X. In ordinary operation, the voltage on WRITE line X is held at ground potential by the output of a signal source 54, which may be one section of the decoder 16 of FIGURE 1. Thus, in the steady state, transistor 50 is biased on to complete the feedback path for the flip-flop, and transistor 56 is biased off, effectively decoupling the input of the flip-flop from the digit line $D_1$.

In one steady state of the flip-flop, transistors 32 and 42 are biased on and transistors 40 and 34 are biased off. This may be considered the "set" state in which the flip-flop stores a binary "1" bit. The conducting states are reversed when the flip-flop is reset, i.e. storing a binary "0" bit.

In order to provide isolation for data input and read output on a common digit line, a coincidence gate means 66 is provided at one output of the flip-flop. In general, this coincidence gate means is one which has a conduction path connected between the positive terminal of source 36 and the common digit-sense line $D_1$. The gate 66 is illustrated as comprising a pair of N-type insulated-gate field-effect transistors 68, 70 having their conduction paths connected in series. Gate electrode 72 of transistor 68 is connected directly at the output terminal 46 of the flip-flop, and gate electrode 74 of transistor 70 is connected to READ line X, which is held at ground potential except during readout of word X. It should be mentioned at this point that WRITE line X and READ line X are common to all of the memory elements in the same row, and that the common digit-sense line $D_1$ is common to all of the elements in the same column of the memory.

A sense-drive circuit for a column of memory elements is shown at the bottom of FIGURE 2. This circuit comprises a PNP transistor 80 and an NPN transistor 82 having their respective emitter electrodes 84 and 86 connected together and to the digit line $D_1$. The collector 88 of transistor 82 is connected to the positive terminal of a source 90 of $V_2$ volts, the negative terminal of the source 90 being grounded. Transistor 80 has its collector 94 connected by way of an impedance element 96, illustrated as a resistor, to the negative terminal of a source 98 of $V_3$ volts, the positive terminal of the source being grounded. The base electrodes 100 and 102 of these transistors are connected together and to the ungrounded terminal of an input source 106. Source 106 may be one of the sections of the data input source 20 of FIGURE 1. An output terminal 110 is provided at the collector 94 of transistor 80.

Input source 106 provides digital output signals or levels having either a first voltage value or a second voltage value of approximately ground potential and $+V_1$ volts, respectively. When the input voltage is at ground potential transistor 80 is biased on and transistor 82 is biased off. When the input voltage is at approximately $+V_1$ volts, transistor 82 is biased on and transistor 80 is based off.

As is known, a memory input or output line has associated therewith a capacitance, the value of which depends upon the number of memory elements on the line and other factors. Dashed capacitor 120 represents the total capacitance loading on the common digit-sense line $D_1$. For high speed operation, it is necessary to charge or discharge this capacitance 120 rapidly. Hence, it is desirable that the driver circuit be one which presents a low impedance to the capacitance 120. Also, for high speed operation, it is desirable that a current rather than a voltage be used as the sense signal. If a voltage were employed, it would be necessary to charge or discharge the capacitance 120, generally through a high impedance circuit. Such an arrangement would be inherently slow because of the charge or discharge time of the capacitance. By employing current sensing, as will be seen, high speed operation can be achieved because the capacitance need not be charged or discharged as in the case of voltage sensing.

Consider now the operation of the FIGURE 2 circuitry. Ordinarily, the WRITE line X and the READ line X are both held at ground potential by the sources 54 and 76, respectively. Transistors 56 and 70 then are biased in a nonconducting condition, whereby the input and output of the flip-flop are essentially disconnected from the digit line $D_1$. When it is desired to write a binary "0" into flip-flop 30, control source 54 is operated to apply a level of $+V_1$ volts on WRITE line X and input source 106 is operative to apply ground potential at the bases of transistors 80 and 82. Transistors 50 and 82 then are biased off and transistors 56 and 80 are biased on.

Transistor 80 operates as an emitter follower and provides a low output impedance voltage drive to the digit line $D_1$ for rapidly discharging any charge on capacitor 120. Neglecting the small emitter-base drop in transistor 80, a voltage of approximately ground potential is applied through transistor 56 in the flip-flop input means to turn on transistor 34 and turn off transistor 32. The voltage at output junction 44 then rises to $+V_1$ volts and biases on transistor 40 and biases off transistor 42. This is the reset state of the flip-flop. At the termination of the positive level on WRITE line X, transistor 50 turns on to complete the feedback path, transistor 56 turns off, and the flip-flop thereafter is insensitive to the voltage on the digit line $D_1$.

When it is desired to write a binary "1" into the flip-flop 30, source 54 applies a level of $+V_1$ volts on WRITE line X, and input source 106 applies an input voltage of approximately $+V_1$ volts at the bases of transistors 80 and 82. The latter voltage biases transistor 80 off and biases transistor 82 on. Transistor 82 operates as an emitter follower and provides a low output impedance for charging the line capacitance 120 rapidly. A voltage of approximately $+V_1$ volts is applied through transistor 56 to turn on transistor 32 and turn off transistor 34 in the flip-flop. The output voltage at junction 44 then is approximately ground potential, which biases on transistor 42 and biases off transistor 40. The flip-flop now is in the set state. At the end of the WRITE period, the voltage on WRITE line X falls to ground potential, turning transistor 50 on and turning transistor 56 off.

When it is desired to sense the output of the flip-flop, source 76 applies a potential of $+V_1$ volts on READ line X, and input source 106 applies ground potential at the base electrodes of transistors 80 and 82. The voltage on the WRITE line X is at ground potential at this time, whereby the state of the flip-flop cannot be changed regardless of the voltage on the digit line $D_1$.

Transistors 70 and 80 are biased on at this time. If the flip-flop is storing a binary "1," the voltage at output terminal 46 is at $+V_1$ volts, and transistor 68 also is biased on. There is then a complete current path between the positive terminal of source 36 and the emitter of transistor 80. Transistor 80, during the read operation, operates as a common base transistor. Current flows from source 36 through transistors 68 and 70 and then through transistor 80 and collector resistor 96 to voltage source 98. Since the voltage at emitter 84 is determined primarily by the voltage at its base electrode 102, the voltage across the line capacitance 120 is determined by the base 102 voltage rather than by the output voltage of the flip-flop and, hence, there is no need to charge or discharge the capacitance in accordance with the flip-flop output. The sense current flowing through collector resistor 96 causes a voltage drop across this resistor, which voltage may be sensed at the output terminal 110.

During the READ operation, all of the WRITE lines in the memory are held at ground potential, whereby no new information can be written into any of the flip-flops. Only one READ line is energized, whereby only the transistors 70 in the selected word are biased on. Thus, only the information stored in the flip-flops for the selected word is read out. Further, the read-out is nondestructive since there is no input to the flip-flops at this time.

A sense drive circuit of the type shown at the bottom of FIGURE 2 has been found capable of charging or discharging a capacitive load of 150 pf. in less than five nanoseconds, which results in a very fast READ/WRITE cycle for a memory of insulated-gate field-effect transistor flip-flops.

What is claimed is:

1. The combination comprising:

a flip-flop having an input means and at least one output terminal;

coincidence gate means having a conduction path connected at one end to a point of fixed potential, a first control electrode connected to said output terminal, and a second control electrode;

means for applying a gating signal at said second control electrode when it is desired to sense the output of said flip-flop;

a common input-sense line connected to both said input means and to the other end of said conduction path;

first and second transistors of opposite conductivity type each having first and second electrodes defining the ends of a conduction path, and a control electrode, the first electrode of each transistor being connected to said common input-sense line;

an impedance element having one terminal connected to the second electrode of the first transistor;

means for connecting the second electrode of the second transistor and the other terminal of said impedance element to points of suitable operating potential; and means for applying input signals in common to the control electrodes of said first and second transistors.

2. The combination as claimed in claim 1, wherein the active elements in said flip-flop are insulated-gate field-effect transistors, and wherein said coincidence gate means is an insulated-gate field-effect transistor means.

3. The combination as claimed in claim 2, wherein said insulated-gate field-effect transistor means comprises first and second insulated-gate field-effect transistors each having a source, a drain, and a gate, wherein said conduction path comprises the series connected source-drain paths of said first and second field-effect transistors, and wherein the gates of said first and second field-effect transistors are the said first control electrode and second control electrode, respectively.

4. The combination as claimed in claim 1, wherein said first and second transistors are bipolar transistors, and wherein the emitter electrodes thereof are the first electrodes, the collector electrodes are the second electrodes, and the base electrodes are the control electrodes.

5. The combination as claimed in claim 4, wherein said impedance element is a resistor, and including an output terminal coupled to the collector electrode of the first transistor.

6. The combination as claimed in claim 4, wherein the base electrodes of said first and second transistors are connected together, and wherein the input signals applied at said base electrodes have either a first value or a second value, an input signal of the first value biasing the first transistor on and the second transistor off, and an input signal of the second value biasing said first transistor off and said second transistor on.

7. The combination as claimed in claim 6, wherein an input signal of said first value is applied at the base electrodes of said first and second transistors whenever a gating signal is applied at the second control electrode of said coincidence gate means.

8. The combination comprising:

a binary memory array of storage cells arranged in rows and columns, each row of cells storing the digits of a word;

a separate write control line and a separate read control line for each row of cells;

a separate digit-sense line for each column of cells;

each cell comprising: an insulated-gate field-effect transistor flip-flop having an input point and at least one output point; gate means having an output electrode connected at said input point, a control input electrode connected to the associated write control line, and a digit input electrode connected to the associated digit-sense line for that flip-flop; and an insulated-gate field-effect transistor coincidence gate means having a conduction path connected between the associated digit-sense line and a point of fixed potential, a first control electrode connected to said output point of the flip-flop, and a second control electrode connected to the associated read control line for that flip-flop; and a separate sense-drive circuit for each column of storage cells, each said circuit including: first and second transistors of opposite conductivity type each having first and second electrodes defining a conduction path, and a control electrode; the first electrode of each of the first and second transistors being connected to the associated digit-sense line; an impedance element having one terminal connected at the second electrode of the first transistor; means for connecting the other terminal of said impedance element and the second electrode of the second transistor to points of suitable operating potential; and means for applying input signals in common to the control electrodes of said first and second transistors.

9. The combination as claimed in claim 8, wherein the said first and second transistors of a said sense-drive circuit are bipolar transistors having collector, emitter and base electrodes, wherein the emitter electrodes are said first electrodes, the collector electrodes are said second electrodes, and said base electrodes are said control electrodes, and wherein the input signals applied in common to the base electrodes are digital signals having either a first value or a second value, a digital signal of the first value biasing the first transistor on and the second transistor off, and a digital signal of the second value biasing the first transistor off and the second transistor on; and including an output terminal connected at a point in the collector circuit of said first transistor.

10. The combination as claimed in claim 9, wherein an input signal of said first value is applied to each sense-drive circuit when a read control signal is applied on any said read control line.

No references cited.

BERNARD KONICK, *Primary Examiner.*

T. FEARS, *Assistant Examiner.*